(12) United States Patent
Aihara et al.

(10) Patent No.: US 7,228,188 B1
(45) Date of Patent: Jun. 5, 2007

(54) RECORDING AND REPRODUCING APPARATUS AND A METHOD THEREOF

(75) Inventors: Tadahiro Aihara, Hachioji (JP); Takafumi Ito, Ome (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 1361 days.

(21) Appl. No.: 09/660,490

(22) Filed: Sep. 12, 2000

(30) Foreign Application Priority Data

Dec. 28, 1999 (JP) ............................. 11-373519

(51) Int. Cl.
*G06F 17/00* (2006.01)
*H04B 1/20* (2006.01)

(52) U.S. Cl. ......................................... 700/94; 369/1
(58) Field of Classification Search .................. 700/94, 700/40, 75; 369/2, 29
See application file for complete search history.

(56) References Cited

U.S. PATENT DOCUMENTS

| | | | |
|---|---|---|---|
| 5,699,089 A * | 12/1997 | Murray | 715/823 |
| 5,903,871 A * | 5/1999 | Terui et al. | 704/500 |
| 6,377,350 B1 * | 4/2002 | Paldus et al. | 356/454 |
| 6,377,530 B1 * | 4/2002 | Burrows | 369/59.21 |
| 6,587,641 B1 * | 7/2003 | Maehashi et al. | 386/111 |
| 6,629,000 B1 * | 9/2003 | Moon et al. | 700/94 |
| 6,845,398 B1 * | 1/2005 | Galensky et al. | 709/231 |

FOREIGN PATENT DOCUMENTS

| | | |
|---|---|---|
| JP | 5-101614 | 4/1993 |
| JP | 2512853 | 4/1996 |
| JP | 11-250577 | 9/1999 |

* cited by examiner

*Primary Examiner*—Sinh Tran
*Assistant Examiner*—Andrew C Flanders
(74) *Attorney, Agent, or Firm*—Finnegan, Henderson, Farabow, Garrett & Dunner, L.L.P.

(57) ABSTRACT

The present invention comprises a communicating means to communicate with external device providing content, a storage medium retaining the content capable of recording and reading the content, recording and reproducing means which record the content obtained by means of the communicating means in the storage medium and which read and reproduce the content recorded in the storage medium, a recording operation means to execute a recording operation, control means which judge the recording and reproducing process conditions when the recording operation means is operated, and if the content is reproduced, after stopping the reproduction, while if the content is not reproduced, immediately, control the content received by means of the communicating means so as to be recorded in the storage medium.

3 Claims, 8 Drawing Sheets

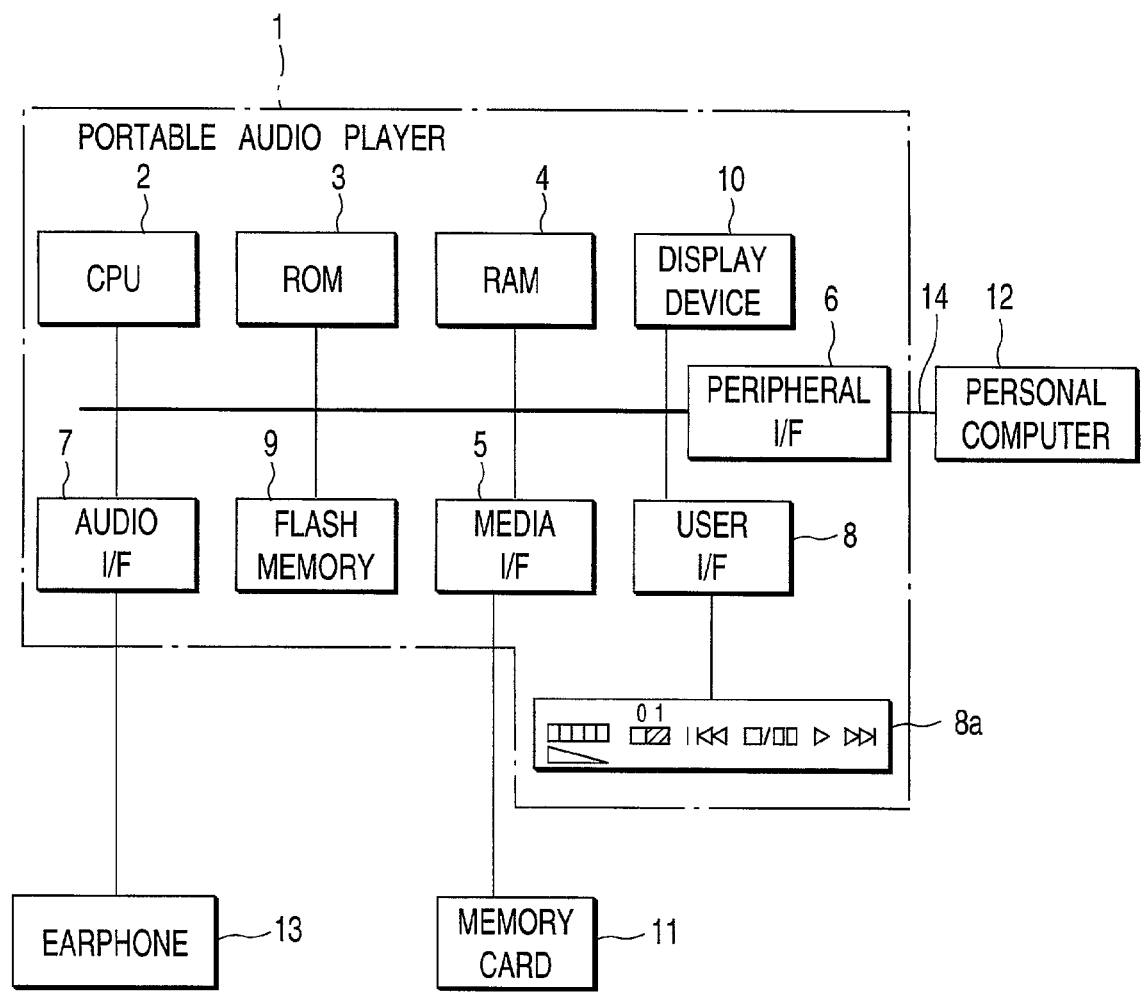
F I G. 1

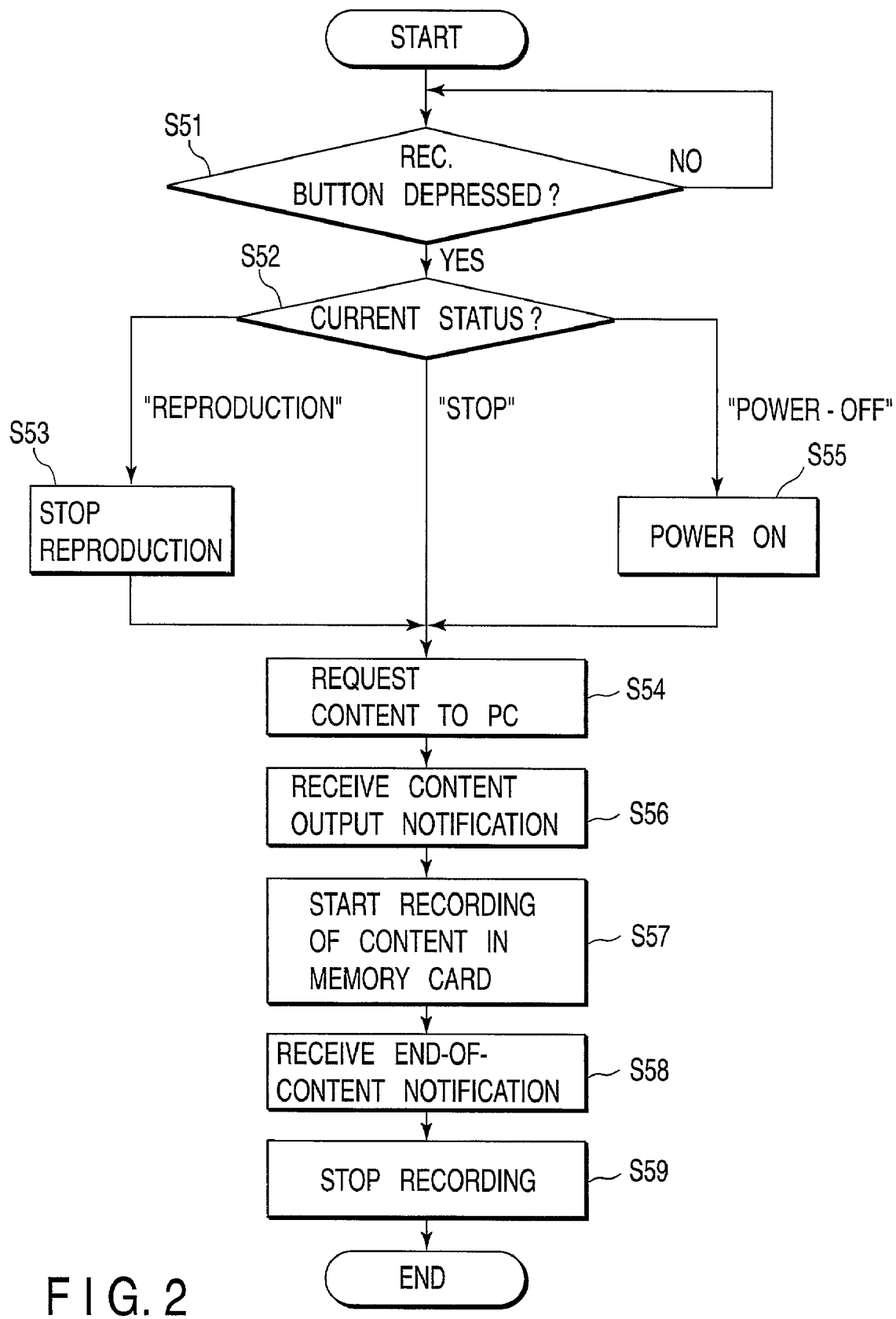
F I G. 2

RECORDING AND REPRODUCING APPARATUS AND A METHOD THEREOF

CROSS-REFERENCE TO RELATED APPLICATIONS

This application is based upon and claims the benefit of priority from the prior Japanese Patent Application No. 11-373519, filed Dec. 28, 1999, the entire content of which are incorporated herein by reference.

BACKGROUND OF THE INVENTION

This invention relates to a recording and reproducing apparatus and to a method of recording and reproducing contents.

Most of the conventional portable audio players which have a recording and reproducing function use such medium as a magnetic tape, a magneto-optical disk and others, and these players have a rotary drive mechanism and accordingly have such problems as the electric power consumption being relatively large, and there being a limit to the miniaturization of the device.

In recent years, MP3 players have been developed using an audio-compression technique of MPEG-1 audio layer 3 which is capable of compressing the data amount to $1/10$ of an audio CD (compact disk) without deteriorating the sound quality. Since the data can be stored in a semiconductor memory, MP3 player is power saving and small. A light and compact portable audio player dealing with audio data for MP3, however, has a difficulty.

The difficulty occurs when the user tries to record new audio data in this portable audio player. It is necessary to connect the portable audio player with another device to reproduce content, and then to have the device start reproduction of a content and at the same time have the portable audio player start recording of another content. It is more troublesome than expected.

Concretely, in order to store (record) audio data in a portable audio player, in addition to the portable audio player, a device to reproduce audio data, for example, a CD player and others, is necessary. An output terminal of the device to reproduce audio data and an input terminal of the portable audio player are connected by means of a cable. When a digital signal is used, a cable for a digital signal such as an optical cable is employed, whereas when an analog signal is used, a cable for an analog signal is used for connection.

Storage medium for recording content, such as a semiconductor memory card, are set in the portable audio player, and the player stands ready for storage (recording).

The reproducing device prepares to reproduce content, and when the reproducing device gets ready, the storing (recording) operation of the portable audio player is started, and then the reproduction operation of audio data by means of the reproducing device is carried out. Thus, the data is stored (recorded) in the storage medium. When the recording is done by means of a digital signal, it is possible to start the storage (recording) automatically if only audio data is reproduced.

In order to finish the storage, first the storage of the portable audio player is completed, and then the reproduction of the content reproducing device is completed. When a digital signal is used for storage, it is possible to complete the storage of the portable audio player only by finishing the audio data reproduction operation of the reproducing device.

In the above-described method, however, each time new content is stored in the storage medium, it is necessary to prepare both the content reproducing device and the portable audio player.

When a personal computer is used as a content reproducing device, it is possible for the personal computer to control the start or stop of the recording of the portable audio player, but it is not possible for the portable audio player to control the personal computer; accordingly, when the user records content in the storage medium, the user needs to operate both the content reproducing device and the portable audio player in time to each other.

Since the user needs to set up a number of operation steps to store content, such as the connection of two devices by means of a cable, the reproduction and recording operations of respective devices, and others, it takes time and knowledge to operate the devices; therefore, only a limited number of users are capable of operating the devices.

Because the portable audio player with an insufficient CPU resource is not capable of executing a recording mode and a reproducing mode at the same time, the user needs to stop the reproduction to record audio data and to stop the recording to reproduce audio data. Accordingly, the user cannot listen to songs which the user wants to in storing the content, and cannot store the data in listening to songs. It is inconvenient.

As described above, conventionally, in order to record new content from an audio data reproducing device to a portable audio player, it is necessary to connect the two devices and operate the devices separately in time to each other. That is, it is necessary to execute the reproduction operation of the reproducing device, and to execute the recording operation of the portable audio player. Thus, the conventional device needs a troublesome operation to record content; hence it is desirable to improve the operationality.

In addition, in recording content such as audio, it was possible to listen to the content to be recorded by means of a monitor, but it was impossible to listen to audio data which the user wants to listen to other than the content being recorded because it was impossible to record or reproduce two contents at the same time.

BRIEF SUMMARY OF THE INVENTION

Accordingly, it is an object of the present invention to provide a recording and reproducing apparatus which is capable of reproducing a certain content and recording other content at the same time.

Another object of the present invention is to provide a recording and reproducing apparatus which is capable of recording a content without a complicated setting or operation.

According to the present invention, there is provided a recording and reproducing apparatus comprising means for recording a content supplied from an external device, means for reproducing the content, means for detecting that said reproducing means performs a reproduction when a recording command is issued, and means for disabling said reproducing means and enabling said recording means when said detecting means detects that said reproducing means performs the reproduction.

According to the present invention, there is provided another recording and reproducing apparatus comprising means for recording a content supplied from an external device, means for reproducing the content, means for detecting that the apparatus is connected to the external device, means for setting an operation mode, and means for controlling said recording means and said reproducing means in accordance with the operation mode when said detecting means detects that the apparatus is connected to the external device.

According to the present invention, there is provided a still another recording and reproducing apparatus comprising means for recording a content supplied from an external device, means for reproducing the content, the reproducing means buffering content data before reproduction, means for detecting that a sufficient amount of the content data is buffered when a recording command is issued during reproduction, and means for enabling said recording means when said detecting means detects that the sufficient amount of the content data is buffered.

According to the present invention, it is possible to record a content supplied from the external device without a complicated setting or operation.

Further, according to the present invention, it is possible to reproduce a content and record another content at the same time.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a diagram showing the entire system of a first embodiment according to the present invention;

FIG. 2 is a flow chart explaining the first embodiment according to the present invention;

DETAILED DESCRIPTION OF THE INVENTION

Figure 3:
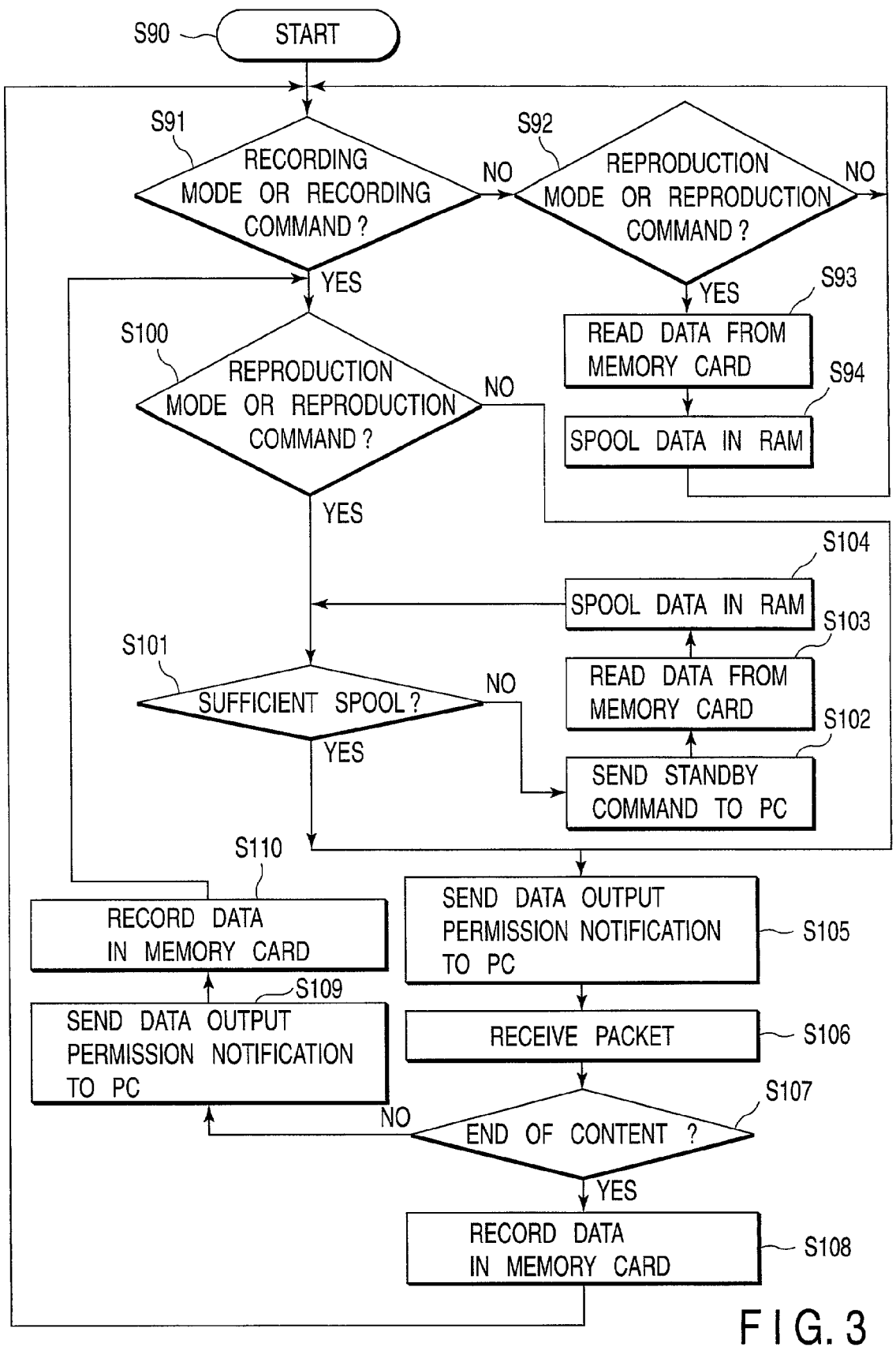
FIG. 3 is a flow chart explaining a second embodiment according to the present invention.

A preferred embodiment of a recording and reproducing apparatus and method according to the present invention will now be described with reference to the accompanying drawings.

First Embodiment

FIG. 1 is a block diagram of a portable audio player (a player hereinafter) as an embodiment of a recording and reproducing apparatus according to the present invention. The player 1 comprises a CPU (processor) 2 which is a center of operations and control; a ROM 3 which is a read-only memory to store programs and others; a RAM 4 which is a random-access memory used for storing data temporarily and executing programs; a medium I/F 5 which is an interface with which such devices as a memory card are connected and which thereby transmits and receives a content; a peripheral I/F 6 which is an interface connected with the content reproducing device by a standard connector such as an USB (Universal Serial Bus) connector and transmitting and receiving data in bi-directional manner; an audio I/F 7 which is an interface for outputting an audio signal to the outside; a user I/F 8 which is an interface with a manual operation means; a flash memory 9 used for recording content and for other purposes; and a display device 10 used for displaying operations and status such as a liquid crystal display (LCD) panel, all of which being connected by internal buses. As a peripheral device, a memory card 11 is connected to the medium I/F 5, a personal computer 12 used as a reproducing device is connected to the peripheral I/F 6 via USB cable 14, and an earphone 13 is connected to the audio I/F 7. It is possible to use a CD player instead of the personal computer 12, and a speaker instead of the earphone 13. As a two-way connector, not only USB connector but an IEEE 1394 and others may be employed.

The ROM 3 contains a program for reading and reproducing the command stored in the memory card 11 connected via the medium I/F 5, a program for storing the data from the peripheral I/F 6 in the memory card 11, and the like.

The CPU 2 executes the programs stored in the ROM 3. The RAM 4 is used as a temporary work memory when the CPU 2 executes the programs in the ROM 2.

The user I/F 8 is connected with a plurality of button switches 8a formed in the main body of the player 1. Among these switches 8a, there are a volume switch for adjusting the volume, reproduction and stop switches giving commands to reproduce or stop reproduction, forward and backward skip switches, a power switch for the ON/OFF operation of the power source, and a recording switch for recording the content. The user I/F 8 is an interface for giving the CPU 2 the information to the effect that the above switches are operated.

The portable audio player according to the first embodiment is configured in such a way that only by pressing the recording switch of the player, when the player is reproducing the content, the player can automatically stop reproduction and start recording of the content given by the personal computer 12, or irrespective of whether the player is not operating or whether the power is off, the player can automatically record the content from the personal computer 12.

The peripheral I/F 6 employs an USB interface which can transmit data in bi-direction manner, one of the standard connecting interfaces of the personal computer 12.

The medium I/F 5 is an interface which reads out data from or writes data in the memory card 11. The memory card 11 stores compressed audio content in PCM (Pulse Coded Modulation) form, ADPCM (Adapted PCM) form or MP3 (MPEG-Audio Layer 3) form, MPEG-2 AAC (Advanced Audio Coding) form and others; when the content from the personal computer 12 via the peripheral I/F 6 is recorded in the memory card 11, the above-mentioned audio content in a file form is output via the USB cable 14, the peripheral I/F 6 and can be stored in the memory card 12 as a file.

The audio I/F 7 comprises a D/A converter which converts a digital signal into an analog signal, an amplifier which amplifies an analog signal obtained after the conversion by the D/A converter, and a terminal (output terminal) which outputs an analog signal amplified by the amplifier to the outside, and the user can hear the reproduced sound by connecting the earphone (or headphone) 13 to the output terminal and thereby converting an analog signal into sound.

The memory card 11 can be fitted on or removed from the player 1 freely, and when the memory card 11 is fitted on the player 1, if the user operates the reproducing switch, the CPU 2 accordingly executes the program in the ROM 3 so that the content recorded in the memory card 11 may be converted into a predetermined data form, and output to the earphone 13 via the audio I/F 7.

The display device 10 displays the results of a given operation, and others.

The personal computer 12 connected to the player 1 is supposed to have the content to be recorded in the player 1 and a transmission program thereof.

That is, the content is stored in the personal computer 12, which is provided with a program for transmitting the stored content; this transmission program functions in such a way that when executed, the program prepares to transmit the content specified by the user, uses a built-in external I/F with the USB connector to transmit data to or receive data from the player 1, and when the program receives a content request signal from the player 1 via the built-in external I/F, after outputting a content output notification, the program begins to transmit the content specified by the user. The personal computer 12 also has a function of transmitting an end-of-content notification to the player 1 when the whole content is transmitted.

The operation of the player 1 according to the first embodiment configured as described above is described with reference to an operation flow chart shown in FIG. 2. The player 1 according to the first embodiment is characterized in that the content can be recorded with a single operation under any conditions.

In order to record the content, the player 1 is connected with the personal computer 12 through the peripheral I/F 6 by means of the USB cable 14. Naturally, the personal computer 12 has the content to be recorded and the transmission program of the content. When the user makes the personal computer 12 execute the transmission program of the content and specifies the content and then gives an command to execute the transmission, the personal computer 12 prepares to transmit the content, functions so that the content may be transmitted to and received from the player 1 using the built-in external I/F with the USB connector, and waits for the content request signal from the player 1 through the external I/F.

In the player 1, the CPU 2 which executes the programs determines whether or not if a recording button is depressed in step S51. If the recording button is depressed, the CPU 2 determines the current status of the player 1 at that time (step S52).

If the determination shows that the player 1 is reproducing content, the CPU 2 makes the player 1 stop reproduction (step S53). The CPU 2 proceeds to step S54. If the determination in step S52 shows that the power is on but that the player 1 is stopped, the CPU 2 directly proceeds to step S54. If the determination in step S52 shows that the power is off, the CPU 2 proceeds to step S55, and controls the power source so that the power is on, and thereafter proceeds to step S54.

In step S54, the CPU 2 output a content request signal to the personal computer 12 via the peripheral I/F 6. On receiving the content request signal, the personal computer 12 outputs a content output notification (step S55), while the player 1, on receiving the output notification, starts recording of content in the memory card 11 (step S57).

As described above, the content is stored in the personal computer 12, which is provided with a program for transmitting the stored content; this transmission program functions in such a way that when executed, the program prepares to transmit the content specified by the user, uses the external I/F with the USB connector to transmit data to or receive data from the portable audio player 1, and when the program receives the content request signal from the player 1 via the external I/F, after outputting a content output notification, the program begins to transmit the content specified by the user.

Accordingly, after the player 1 outputs the content request signal in step S54, the personal computer 12, after outputting the content output notification, starts to transmit the content specified by the user.

In the player 1, the CPU 2, after receiving the content output notification from the personal computer 12 (step S56), receives the content transmitted from the personal computer 12 through the peripheral I/F 6, and records the content in the memory card 11 through the medium I/F 5 (step S57).

When the transmission of the content to be recorded is completed, the personal computer 12 outputs an end-of-content notification, and the player 1, on receiving the notification (step S58), stop recording of content in the memory card 11 (step S58).

As a result, irrespective of whether the player 1 is reproducing or stopped, or the power is off, it is possible to receive the content and record the content in the memory card immediately only with an operation of a recording switch; therefore it is possible to receive and record new content easily.

As described above, the recording and reproducing apparatus according to the present embodiment comprises the interface for being connected with the external device which is capable of bi-directional communication, the storage medium capable of recording and reproducing the content such as audio and visual data, and the recording operation switch to perform a recording operation. The recording and reproducing apparatus, after the recording operation switch is operated, determines the current status of the apparatus, stops reproduction when the content is reproduced, turns on the power when the power is off, or without doing anything otherwise so that the content received through the interface can be recorded in the storage medium.

Thus, only by connecting the external device providing the content such as audio and visual data through the interface for being connected with the external device and by operating the recording operation switch, the recording of the received content in the storage medium gets ready; therefore it is possible to record a variety of content such as audio and visual data from the external device in the storage medium easily without complicated operations.

It may be possible to modify the first embodiment such that the stopped reproduction (at step S53) is automatically restarted after the recording is completed (step S59).

Other embodiments of the recording and reproducing apparatus and method according to the present invention will be described. The same portions as those of the first embodiment will be indicated in the same reference numerals and their detailed description will be omitted.

Second Embodiment

In the above embodiment, it is possible to record content easily in the storage medium with one touch of the recording switch of the player 1 without operating the external device as content reproducing device and the player 1 as recording device in time to each other, and accordingly it is possible to stop the reproduction automatically even when the content is reproduced so that the content may be recorded.

The second embodiment of recording and reproducing apparatus will be described below which is capable of recording content other than content being reproduced and reproducing the content without interrupting, and of recording and reproducing the contents at the same time.

The basic constitution of the player 1 in the second embodiment is as shown in FIG. 1, and all the components have the same function as that of the components described in the first embodiment except the program of the ROM 3 and the user I/F 8; therefore only different components will be described here.

In the second embodiment, so that it may be possible to record and reproduce different contents at the same time, the program of the ROM 3 is capable of executing the recording operation and the reproducing operation simultaneously. When the content is reproduced, content is spooled in the memory (RAM 4) and then the reproducing is started, thereby it is possible to reproduce the content without interruption when the received content is recorded. For that purpose, the ROM 3 is programmed in such a way that it is possible to record and reproduce the contents simultaneously and to starting reproduction after a sufficient amount of data (more than the required amount preset so that the content may be reproduced without interruption) is spooled in the RAM 4. Therefore, the received content can be recorded while another content is reproduced. Since the recording of the content transmitted from the personal computer 12 is started when the personal computer 12 transmits a recording command, the personal computer 12 is programmed to transmit the recording command before transmitting the content to the player 1 which records the content. When the personal computer 12 receives a standby command from the player 1, the personal computer 12 waits for executing the transmission of the content until the standby command is cancelled; when the standby command is cancelled, that is, when the personal computer 12 receives a data output permission notification from the player 1, the personal computer 12 starts transmission of the content.

Accordingly, in the player 1, the program of the ROM 3 is configured such that when the player 1 is ready to reproduce the content, if the amount of the spooled data to be reproduced is not enough, the player 1 transmits the standby command to the personal computer 12 through the peripheral I/F 6 until a sufficient amount of the spooled data (at least the above-mentioned required amount, or more) is detected; and when the spool of the content is completed, the player 1 outputs the data output permission notification.

The personal computer 12 has a function of transmitting an end-of-content notification to the player 1 when the transmission of the content is completed.

The operation of the player 1 according to the second embodiment configured as described above will be described below with reference to an operation flow chart shown in FIG. 3.

The personal computer 12 connected to the player 1 stores the content to be recorded in the player 1 and the transmission program thereof.

That is, the content is stored in the personal computer 12, which is provided with a program for transmitting the stored content; this transmission program functions in such a way that when executed, the program prepares to transmit the content specified by the user, uses the built-in external I/F with the USB connector to transmit data to or receive data from the player 1, and when the program receives a content request signal from the player 1 via the built-in external I/F, after outputting a content output notification, the program begins to transmit the content specified by the user.

The player 1 and the personal computer 12 are connected through the peripheral I/F 6 by means of the USB cable 14.

The user operates the personal computer 12 having the content to be recorded and the transmission program of the content to execute the transmission program of the content, and gives an command to execute the transmission after specifying the content.

The personal computer 12 prepares to transmit the content, functions so as to transmit data to or receive data from the player 1 through the built-in external I/F using the USB connector and thereby transmit a recording command to the player 1 through the built-in external I/F. The personal computer 12 waits for a data output permission notification from the player 1.

In the player 1, on the other hand, the CPU 2 executing the program of the ROM 3 performs the process as follows. When the CPU 2 starts to execute the program (step S90), the CPU 2 first determines whether or not the CPU 2 is recording a content or whether or not a recording command is supplied from the personal computer 12 or the user I/F 8 (button switches 8a) (step S91). If the CPU 2 determines that a content is being recorded or there is the recording command, the CPU 2 proceeds to step S100.

In step S91, if the CPU 2 determines that there is no recording command or a content is not being recorded, then the CPU 2 determines whether or not the CPU 2 is reproducing a content or whether or not there is a reproduction command supplied from the user I/F 8 or from the personal computer 12 (step S92). If the CPU 2 determines that it is not the case in step S92, the CPU 2 returns to step S91; if the CPU 2 is reproducing a content or there is the reproduction command, the CPU 2 proceeds to step S93, where the CPU 2 reads the data from the memory card 11, and then spools the data in the memory (RAM 4) and reproduces the data in step S94.

In step S91, if the CPU 2 determines that a content is being recorded or there is the recording command, the CPU 2 proceeds to step S100, where the CPU 2 determines whether or not the CPU 2 is reproducing a content or whether there is the reproduction command. If the CPU 2 determines that neither is the case in step S100, the CPU 2 proceeds to step S105.

If the CPU 2 determines in step S100 that the CPU 2 is reproducing a content or there is the reproduction command, the CPU 2 determines whether or not there is a sufficient amount of data spooled in the memory (RAM 4) at the time of reproduction (step S101).

If there is not a sufficient amount of spooled data, the CPU 2 outputs a data output standby command to the personal computer 12 (step S102), reads the data from the memory card 11 (step S103), and spools the data in the memory (RAM 4) (step S104). The reproduction is continued all the while.

The personal computer 12, on receiving the data output standby command, waits for the transmission of a content until the standby command is cancelled. Thus, the player 1 can be devoted to reproduction, and the data required to make it possible for the content to be reproduced without interruption can be spooled in the memory.

When a sufficient amount of data is spooled, the CPU 2 outputs a data output permission notification to the personal computer 12 (step S105). On receiving the notification, the personal computer 12 outputs a content as packet data, while the player 1 receives the data and takes in the content and records the data in the RAM 4 (step S106).

When the receiving of the packet data is completed, the CPU 2 determines whether or not whether the whole content to be received is received based on an end-of-content notification transmitted from the personal computer 12 (step S107). If the end-of-content notification is active, the CPU 2 determines that the transmission of content is completed, and records the data stored in the RAM 4 in the memory card 11 (step S108), and returns to step S91.

In the end-of-content notification is inactive in step S107, the CPU 2 determines that there remains some data to be received, outputs a data output permission notification to the personal computer 12 in step S109, records the received data in the memory card 11 in step S110, and then returns to step S91.

By setting the above operation steps, it is possible for the player 1 to record and reproduce different contents simultaneously, and if there is not a sufficient amount of the spooled data to be reproduced, the player 1 temporarily stops the receiving of the content to be recorded to give the reproduction priority, and therefore the recording can be performed automatically only by a command from the personal computer 12.

As described above, the recording and reproducing apparatus according to the second embodiment comprises the interface for being connected with the external device which is capable of bi-directional communication, the storage medium capable of recording and reproducing the content such as audio and visual data, and the spool memory (RAM 4) to spool the data to be reproduced. The recording and reproducing apparatus determines the status thereof on receiving a content recording command from the external device, and when a content is being reproduced, if a sufficient amount of the data to be reproduced is spooled in the spool memory, permits the receiving of the content and has the content received through the interface recorded in the storage medium. If there is not a sufficient amount of the spooled data, the receiving of the content is suspended until there is a sufficient amount of the spooled data, and the receiving of the content is permitted after there is a sufficient amount of the spooled data, then, the content received is recorded in the storage medium.

As is described above, the player 1 in this embodiment reproduces the content after the content is spooled in the spool memory (RAM 4). When the player 1 receives a content recording command from the personal computer 12, the player 1 determines the status thereof. When a content is being reproduced, if there is a sufficient amount of the spooled data to be reproduced, the receiving of the content is permitted, and the content received through the interface from the external device is recorded in the storage medium. If there is not enough amount of the spooled data, the receiving of the content is permitted after there is enough amount of the spooled data, and then, the received content is recorded in the storage medium.

Accordingly, it is possible to reproduce content such as audio and visual data without interruption and to perform recording simultaneously and automatically. There can be provided a portable audio player capable of recording and reproducing simultaneously which is extremely easy to handle.

Third Embodiment

In the above embodiments, it is possible to record and reproduce the contents simultaneously. The third embodiment will be described below which is capable of stopping the reproduction and recording the content automatically, or recording the content automatically after the completion of the reproduction according to the operation mode set up in the player 1 upon being connected by means of a cable to the personal computer 12 which provides the content.

In this embodiment too, the basic constitution of the player 1 is as shown in FIG. 1, and all the components have the same function as that of the components described in the first embodiment except the program of the ROM 3 and the user I/F 8. Accordingly, only different components will be described here.

In a portable audio player in the third embodiment is provided with a plug and play function of automatically detecting and recognizing the connection with the external device and enabling the use thereof, which recent personal computers have. This function enables the program in the ROM 3 to prepare to start the communication when the personal computer 12 and the player 1 are connected by means of a bi-directional communication cable, for instance, the USB cable 14, and thereafter to start the execution.

The user I/F 8 is connected to a plurality of switches formed in the main body of the player 1. Among these switches, there is a volume switch, a reproduction and stop switch, forward and backward skip switches, a power switch, a switch for recording in the memory card 11, and a mode setting switch to set up the operation mode of the reproduction and recording of the content.

The mode setting switch is capable of selecting one of the following four modes and performing the setting.

Mode 1: This is a reproduction priority mode having a function "Continue reproduction if it is connected to external device during reproduction."

Mode 2: This is a recording priority mode having a function "Stop reproduction if it is connected to external device during reproduction and automatically record content."

Mode 3: This is a post-reproduction recording mode having a function "Wait until reproduction is completed if it is connected to external device during reproduction, and after reproduction is completed, automatically record content."

Mode 4: This is a post-recording reproduction mode having a function "Temporarily stop reproduction if it is connected to external device during reproduction, and wait until content is completely recorded, and after recording is completed, restart the interrupted reproduction."

The program in the ROM 3 is made so as to be able to execute each of the above modes so that the operation and control may be carried out according to each of the modes, and the contents of the set mode can be stored in the flash memory 9.

In this embodiment, the information of the set mode is stored in the flash memory 9, and when the USB cable 14 is connected to the peripheral I/F 6, the program performs an operation according to the content of the setting by reading the set up information in the flash memory 9.

The operation of the player 1 according to the third embodiment configured as described above will be described below with reference to an operation flow chart shown in FIG. 4.

The personal computer 12 connected to the player 1 stores the content to be recorded in the player 1 and the transmission program thereof.

That is, the content is stored in the personal computer 12, which is provided with the program for transmitting the stored content; this transmission program functions in such a way that when executed, the program prepares to transmit the content specified by the user, using the external I/F with the USB connector to transmit data to or receive data from the player 1. When the program receives a content request signal from the player 1 via the external I/F, after outputting a content output notification, the program starts to transmit the content specified by the user.

The user operates the personal computer 12 having the content to be recorded and the transmission program of the content to execute the content transmission program, and the user gives an command to execute the transmission after specifying the content.

The player 1 and the personal computer 12 are connected by means of the USB cable 14.

The personal computer 12 prepares to transmit the content, functions so as to transmit data to and receive data from the player 1 through the external I/F using the USB connector, and thereby transmits a recording command to the player 1 through the external I/F. The personal computer 12 waits for a data output permission notification from the player 1.

Figure 4:
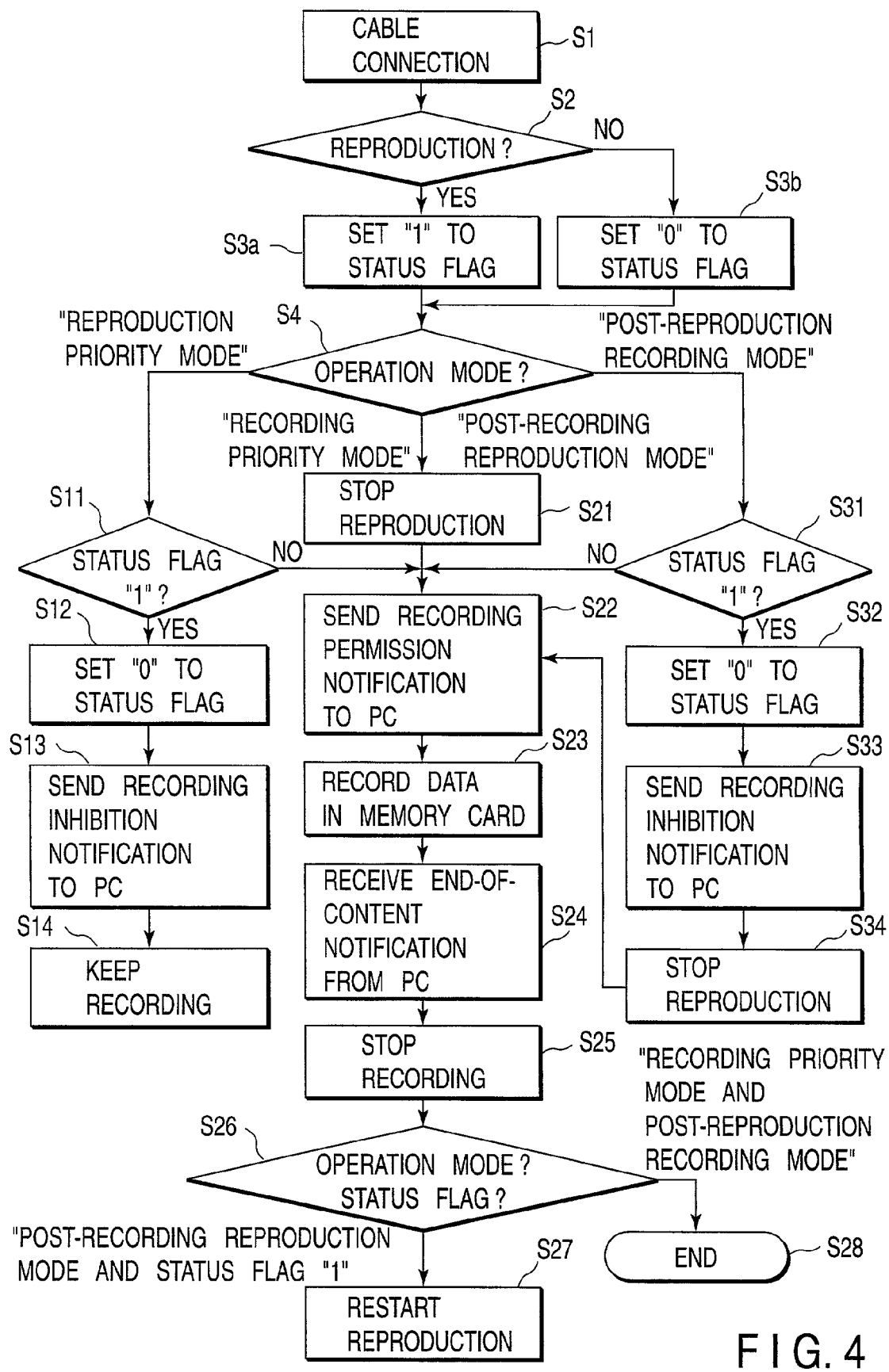
FIG. 4 is a flow chart explaining a third embodiment according to the present invention.

In the player 1, on the other hand, the CPU 2, by executing the program in the ROM 3, executes the process as in a flow chart in FIG. 4

The CPU 2 of the player 1 which is executing the program, when the cable 14 is connected (step S1), determines whether or not the content is being reproduced (step S2). If the CPU 2 determines that the content is being reproduced, the CPU 2 sets the status flag at "1" (step S3*a*), and then reads the setting content of the operation mode from the flash memory 9 and based on the information determines the operation mode (step S4).

If the CPU 2 determines that the content is not being reproduced in step S2, the CPU 2 sets the status flag at "0" in step S3*b* and proceeds to step S4. If the set mode is the reproduction priority mode in step S4, the CPU 2 proceeds to step S11, where the CPU 2 determines whether or not the status flag is "1". If the status flag is determined "1", the CPU 2 changes the status flag back to "0" and transmits a recording inhibition notification to the personal computer 12 in step S13. The player 1 continues reproduction of the content (step S14).

If the status flag is determined "0" in step S11, the CPU 2 determines that the player 1 is stopped or the power is off, and proceeds to step S22.

In step S22, the CPU 2 transmits a recording permission notification to the personal computer 12, which accordingly transmits back the content. The CPU 2 receives the content and records the content in the memory card 11 through the medium I/F 5 (step S23). On receiving an end-of-content notification from the personal computer 12 (step S24), the CPU 2 stops the recording (step S25) and determines the operation mode and the status flag (step S26). If the status flag is determined "0" or the operation mode is the recording priority mode or the post-reproduction recording mode, the CPU 2 finishes the process (step S28).

If the operation mode is the post-recording reproduction mode, and the status flag is "1", the CPU 2 restarts the reproduction (step S27).

In step S4, if the CPU 2 determines that the set mode is the recording priority mode or the post-recording reproduction mode, the CPU 2 proceeds to step S21 and stops the reproduction. In step S22, the CPU 2 transmits a recording permission notification to the personal computer 12. The personal computer 12 accordingly transmits the content to be recorded, which the CPU 2 records in the memory card 11 (step S23). When the whole content is transmitted, the personal computer 12 transmits an end-of-content notification (step S24), and accordingly the recording is stopped (step S25).

In step S26, the CPU 2 determines the operation mode and the status flag, and if the status flag is determined "1" and the operation mode is determined the post-recording reproduction mode, in step S27, the CPU 2 restarts reproduction of the content, while if the status flag is determined "0" or the operation mode is determined the recording priority mode or the post-reproduction recording mode, the CPU 2 stops in step S28.

In step S4, if the mode setting is determined the post-reproduction recording mode, then the CPU 2 determines whether or not the status flag is "1" (step S31). If the flag is "1", the CPU 2 determines that a cable is connected during the reproduction of the content, and changes the status flag back to "0" (step S32) and transmits a recording inhibition notification to the personal computer 12 (step S33).

The personal computer 12, on receiving the recording inhibition notification from the player 1, waits until a recording permission notification is transmitted from the player 1. The player 1 continues the reproduction of the content, and when the reproduction of the content is completed (step S34), the CPU 2 outputs a recording permission notification to the personal computer 12 (step S22).

Thereafter, the CPU 2 executes the same processes and operations as steps S23 to S28 in the case of the recording priority mode.

If the status flag is "00" in step S31, the CPU 2 determines that the content is not reproduced when the USB cable 14 is connected, and proceeds to step S22. Thereafter, the same processes and operations as steps S23 to S28 in the case of the recording priority mode are executed.

As described above, it is possible to provide a portable audio player capable of stopping the reproduction and recording the content automatically, or of recording the content automatically after the reproduction is completed, according to the preset operation mode by connecting the player with the personal computer 12 which provides the content.

The recording and reproducing apparatus in the third embodiment comprises the interface for being connected with the external device by means of a bi-directional communication cable, and the storage medium capable of recording and reproducing the content such as audio and visual data. The recording and reproducing apparatus starts the recording operation of the received content when the communication cable is connected, and is capable of selecting one of:

(1) the reproduction priority mode having a function of continuing the reproduction of the content if a bi-directional communication cable is connected during the reproduction of the content;

(2) the recording priority mode having a function of stopping the reproduction of the content if a cable is connected during the reproduction of the content and recording the content received from the external device in the storage medium;

(3) the post-reproduction recording mode having a function of waiting until the completion of the reproduction of the content being reproduced if a cable is connected during the reproduction of the content, and after the completion of the reproduction, receiving the content from the external device and recording the data in the storage medium; and (4) the post-recording reproduction mode having a function of stopping temporarily the reproduction of the content being reproduced if a cable is connected during the reproduction of the content, recording the content transmitted from the external device in the storage medium, and after the completion of the recording, resuming the interrupted reproduction of the content.

By making it possible to set the relation between the reproduction and the recording in a variety of ways, it is possible to provide a portable audio player which is capable of selecting from a variety of forms such as automatically recording the content transmitted from a content provider, for example, a personal computer, automatically recording the content after the completion of the reproduction of the content, or interrupting the reproduction of the content and after automatically recording the content, resuming the reproduction of the content the reproduction of which has been interrupted, and which is capable of automatically executing the operations of reproduction or recording easily only by means of the connection with a bi-directional communication cable.

Fourth Embodiment

Now the fourth embodiment will be described which is capable of controlling the reproduction and recording of the content on the part of the player by the operation of only the external device.

A portable audio player in the fourth embodiment according to the present invention will be described. The player 1 capable of automatically reproducing and recording content by the operation of only the external device. In this embodiment too, the basic constitution of the player 1 is as shown in FIG. 1, and all the components have the same function as that of the components described in the first embodiment except the program of the ROM 3. Accordingly, only different components will be described here.

In the fourth embodiment, when the power is off, the CPU 2 is in the operative condition of sleep mode, and the ROM 3 has a program to the effect that the CPU 2 stands by to start the communication when the personal computer 12 and the player 1 are connected by means of a bi-directional communication cable such as the USB cable 14. The CPU 2 executes the process along a flow chart in FIG. 5 on receiving a command signal.

Figure 5:
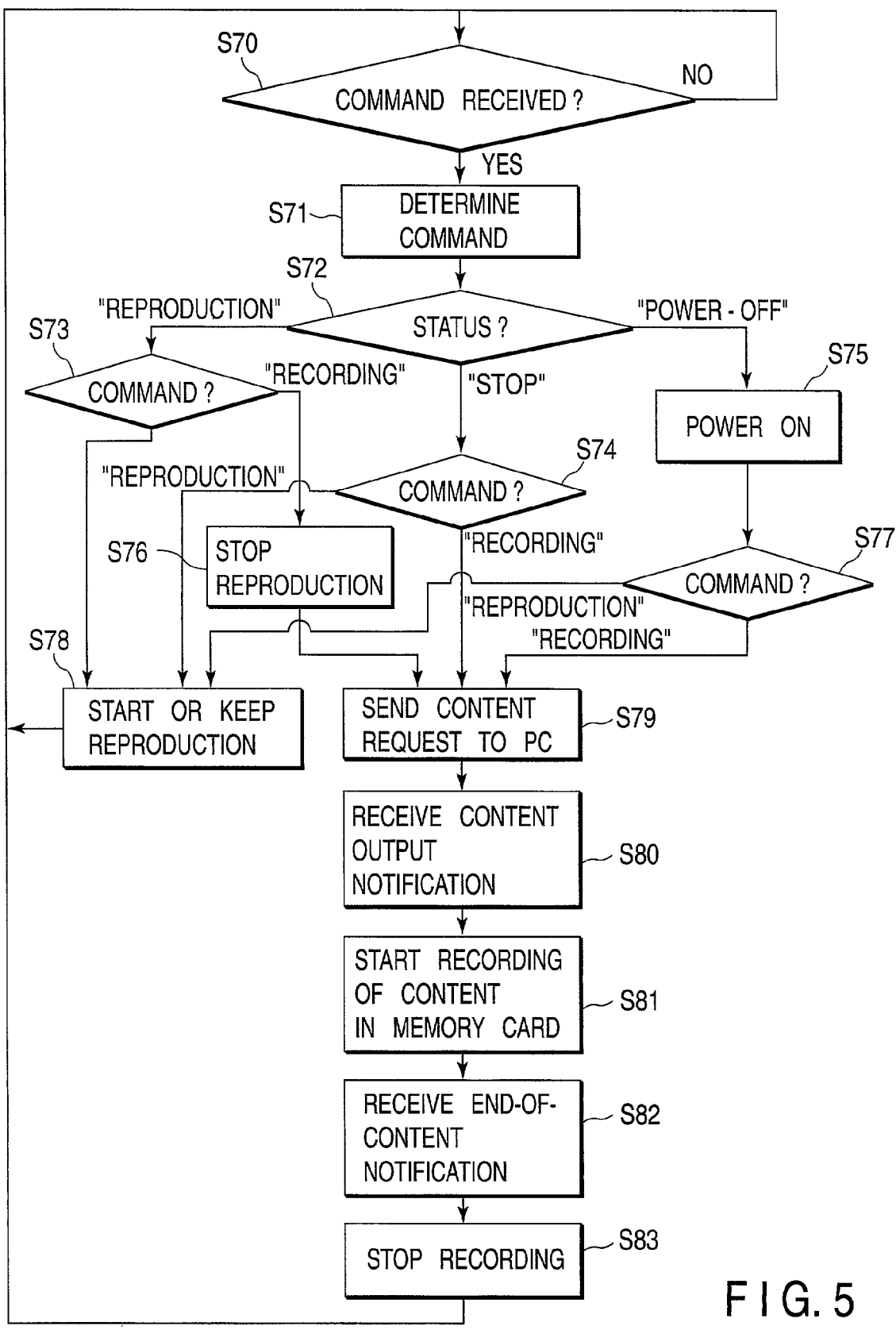
FIG. 5 is a flow chart explaining a fourth embodiment according to the present invention.

The operation of the player 1 in the fourth embodiment configured as described above will be described below with reference to an operation flow chart in FIG. 5.

The player 1 is capable of recording the content transmitted from the personal computer 12 connected with the player 1 and reproducing the recorded content according to the command from the personal computer 12. The personal computer 12 includes a player operating program to realize a function of recording the content in the player 1 and transmitting the content, a function of transmitting a control command such as recording and reproducing according to the user's operation command, and a function of displaying the content of the requirement from and response to the player 1 or carrying out the control according to the command.

The operation of the player 1 will be described below with reference to the operation flow chart in FIG. 5.

In the fourth embodiment, the personal computer 12 having the content to be recorded and the transmission program thereof and the player 1 are connected by means of the USB cable 14. Under this condition, the player 1 always receives a command signal from the personal computer 12 (step S70).

The user operates the personal computer 12 to execute the player operating program. In order to record the content, the user specifies the content and gives a command to start recording, while in order to reproduce the content, the user gives a command to start reproduction. In the former case, the personal computer 12 transmits a recording command signal as a command signal, and in the latter case, the personal computer 12 transmits a reproduction command signal as a command signal.

In the player 1 standing by for the reception of a command signal from the personal computer 12, the CPU 2 determines what the received command is. If the received command is a recording or reproduction command, the CPU 2 stores the contents of the received command in the RAM 4 (step S71). The CPU 2 determines the current status of the player 1 (step S72). In step S72, the CPU 2 determines whether or not the power is on or off, whether the content is reproduced or recorded or the process is stopped.

After the determination of the current status of the player 1 in step S72, if the content is being reproduced, the CPU 2 determines the contents of command stored in step S71 (step S73). If the command stored in step S71 is the reproduction command, the CPU 2 has the reproduction of the content continued (step S78), while if the command stored in step S71 is the recording command, the CPU 2 has the reproduction stopped (step S76), and then proceeds to step S79.

As a result of the determination (determination of the current status of the player 1) in step S72, if the power is on but the reproduction is stopped, the CPU 2 determines the command stored in step S71 (step S74). If the command is determined to be the reproduction command, the CPU 2 starts the reproduction of the content (step S78). If the command is determined to be the recording command in step S74, the CPU 2 proceeds to step S79.

If the CPU 2 determines that the power is off in step S72, the CPU 2 turns the power on (step S75), and determines the command in step S71 (step S77). If the command is determined to be the reproduction command, the content is reproduced (step S78), and if the command is determined to be the recording command, the CPU 2 proceeds to step S79.

In step S79, the CPU 2 transmits a content request signal to the personal computer 12 through the peripheral I/F 6. The personal computer 12, on receiving the content request signal, transmits a content output notification, while the player 1, on receiving the notification (step S80), starts to record the content in the memory card 11 (step S81).

That is, as described above, the content is stored in the personal computer 12, which stores the program for transmitting the stored content. The transmission program functions in such a way that when executed, the program prepares to transmit the content specified by the user, and uses the USB connector to transmit data to or receive data from the player 1. When the program receives a content request signal from the player 1 via the built-in external I/F, after outputting a content output notification, the program starts to transmit the content specified by the user.

Accordingly, the player 1 outputs the content request signal in step S79, and the personal computer 12, on receiving the content request signal, outputs a content output notification, and starts to transmit the content specified by the user.

In the player 1, the CPU 2, after receiving the output notification from the personal computer 12, receives the content transmitted from the personal computer 12 through the peripheral I/F 6, and records the content in the memory card 11 through the medium I/F 5 (step S81).

When the transmission of the content is completed, the personal computer 12 transmits an end-of-content notification. The CPU 2 of the player 1 receives the notification. The player 1 receives the content end-of-content notification in step S82 and after the completion of the recording in step S83, the player 1 returns to step S70 and waits for the receiving of the command signal from the personal computer 12.

As described above, in this embodiment when the player is connected with external device such as a personal computer, the player gets ready to receive a command signal from the external device. When the external device transmits a reproducing or recording command signal, the player reproduces or records the content according to the command signal. Thus, it is possible to make the portable audio player automatically reproduce or record the content with the operation of only the external device without directly operating the portable audio player.

The recording and reproducing apparatus in this embodiment comprises the interface which is capable of bi-directional communication for being connected with an external device, the storage medium capable of recording and reproducing the content such as audio and visual data, and a control section which waits for a command signal from the external device. When the player is connected with the external device such as a personal computer by means of a bi-directional communication cable, and the recording or reproducing is executed according to the recording or reproducing command signal given by the external device. After the completion of the recording or reproducing, a command signal from the external device is again waited for. It is possible to provide a recording and reproducing apparatus capable of selecting and executing the reproducing or recording of the content by means of the external device irrespective of whether the content is being reproduced or stopped or the power is off.

Fifth Embodiment

In the second embodiment, when different contents are recorded and reproduced simultaneously, if a sufficient amount of the reproduced data is not spooled, in order to give priority to the reproduction, the receiving of the recorded data is stopped temporarily until a sufficient amount of the reproduced data is spooled. However, there may occur a case in which the recording cannot be started forever. The fifth embodiment will now be described which is capable of automatically reproducing or recording the content successively according to a preset operation mode when the process load is too heavy for the simultaneous execution of recording and reproduction.

The basic constitution of the player 1 in this embodiment is as shown in FIG. 1, and all the components described have the same function as that of the components described in the first embodiment except the program of the ROM 3 and the user I/F 8. Accordingly, only different components will be described here.

In the fifth embodiment, the user I/F 8 is connected with a plurality of switches formed in the main body of the player 1. These switches are a volume switch, a reproduction and stop switch, forward and backward skip switches, a power switch, and a mode setting switch for setting up the operation mode. A program is stored in the ROM 3 which is capable of recording and reproducing different contents simultaneously and which determines the load of the CPU and when the load is too heavy for the simultaneous execution of recording and reproducing, is capable of automatically reproducing or recording the content according to the preset mode. This mode is not only set by a command of the player 1, but by a command from the personal computer 12. When the content is reproduced, the reproduced content is spooled in the memory (RAM 4) before the reproduction is started, which makes it possible to reproduce the content without interruption while a received content is recorded. For that purpose, the program in the ROM 3 is programmed so as to be capable not only of recording and reproducing the data simultaneously but of spooling a sufficient amount in the RAM 4 before starting the reproduction so that the content may be reproduced without interruption, and of recording the received content at any time during the reproduction. The recording of the content received from the personal computer 12 is started when a recording command is transmitted from the personal computer 12; accordingly, the personal computer 12 transmits a recording command to the player 1 before transmitting the content to the player 1 for the recording.

The personal computer 12 has a function of suspending the transmission of the content until a standby command is cancelled in receiving a data output standby command from the player 1, and when a standby command is cancelled, that is, when the personal computer 12 receives a data output permission notification from the player 1, the personal computer 12 starts transmitting the content.

Accordingly, the player 1 has a program in the ROM 3 which transmits to the player 1 through the I/F 6 a notification to the effect that the data output should be suspended until a sufficient amount of reproduced data is spooled in the memory when the player 1 is ready to reproduce the content but there is not enough spool amount of the reproduced data, and which outputs a data output permission notification when the sufficient spool of the content is completed.

The personal computer 12 also has a function of transmitting the content specified by the user by means of a bi-directional communication cable, and a function of transmitting an end-of-content notification to the player 1 when the transmission of the content is completed.

Figure 6:
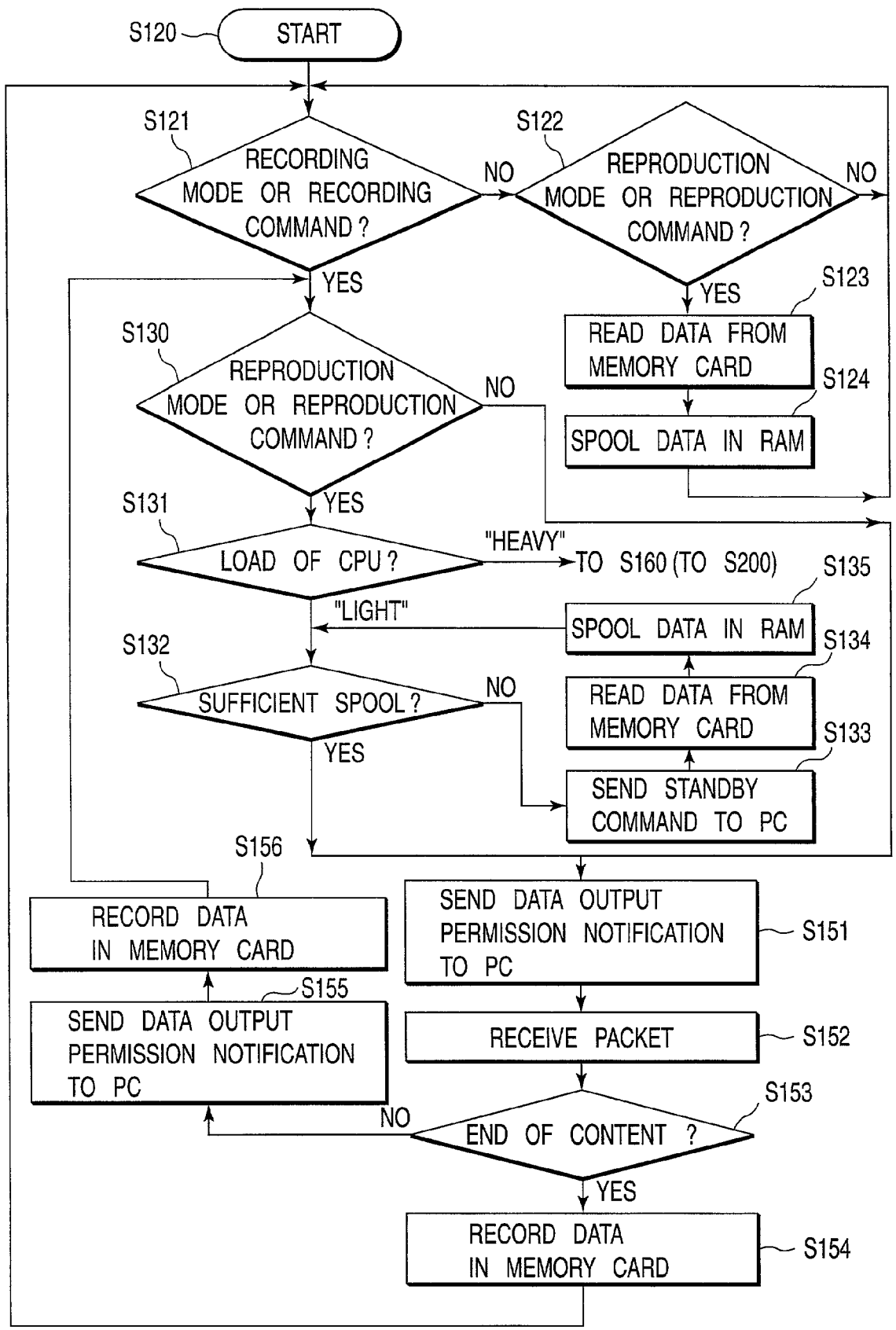
FIG. 6 is a flow chart explaining a fifth embodiment according to the present invention.
Figure 7:
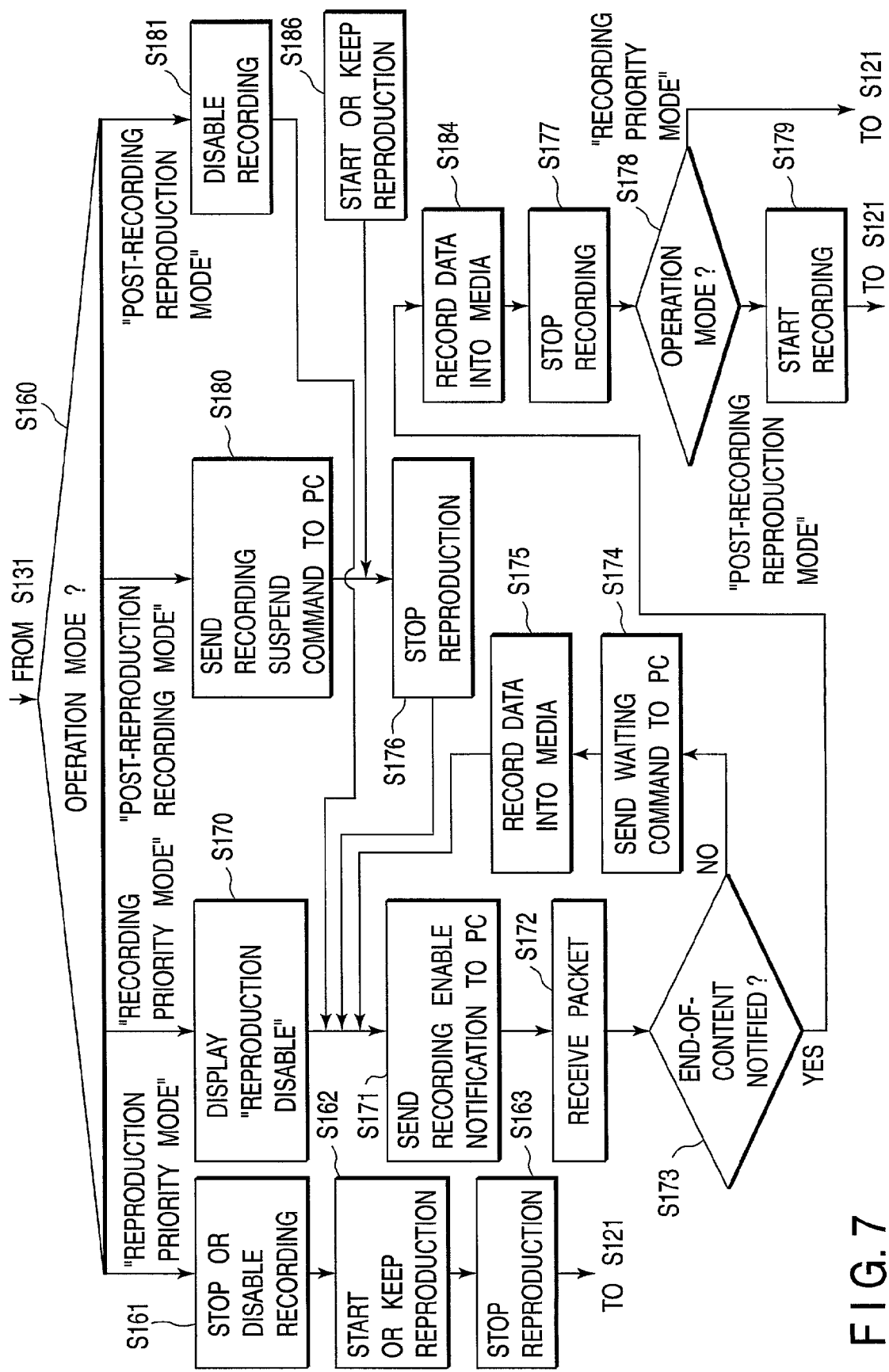
FIG. 7 is a flow chart explaining the fifth embodiment according to the present invention.

The operation of the player 1 in the fifth embodiment configured as described above will be described now with reference to operation flow charts in FIGS. 6 and 7. The flow chart in FIG. 6 shows the process of measuring the CPU load, spooling the reproduced data and recording the content at the time of the recording and reproduction. The flow chart in FIG. 7 shows the process carried out when the CPU load is too heavy for the simultaneous execution of the recording and reproduction.

The personal computer 12 connected to the player 1 is provided with the content to be recorded in the player 1 and a transmission program thereof.

That is, the content is stored in the personal computer 12, which is provided with the program for transmitting the stored content. The transmission program functions in such a way that when executed, the program prepares to transmit the content specified by the user, and uses the built-in external I/F with the USB connector to transmit data to or receive data from the player 1. When the program receives a content request signal from the player 1 via the built-in external I/F, after outputting a content output notification, the program starts to transmit the content specified by the user.

The player 1 and the personal computer 12 are connected through the peripheral I/F 6 by means of the USB cable 14.

The user operates the personal computer 12 having the content to be recorded and the transmission program of the content to execute the transmission program of the content, and the user gives a command to execute the transmission after specifying the content.

The personal computer 12 prepares to transmit the content, functions so as to transmit data to and receive data from the player 1 through the built-in external I/F having the USB connector and thereby transmit the recording command to the player 1 through the built-in external I/F. The personal computer 12 stands by for a data output permission notification from the player 1.

In the player 1, on the other hand, the CPU 2 executes the process by carrying out the program in the ROM 3. When the program is started (step S120), the CPU 2 first determines whether or not the CPU 2 is recording the content or a recording command is output from the personal computer 12 or the user I/F 8 (step S121). If the CPU 2 determines that the CPU 2 is recording the content or there is the recording command, the CPU 2 proceeds to step S130.

In step S121, if the CPU 2 determines that there is no recording command or that the CPU 2 is not recording the content, the CPU 2 proceeds to step S122, and determines whether or not the CPU 2 is reproducing the content or there is a reproduction command output from the user I/F 8 or the personal computer 12. In step S122, if the CPU 2 determines that the CPU 2 is not reproducing the content or there is no reproduction command, the CPU 2 returns to step S121, while if the CPU 2 is reproducing the content or there is the reproduction command, the CPU 2 reads the data from the memory card 11 storing the content (step S123), spools the data in the memory (RAM 4), and reproduces the content (step S124).

In step S121, if the CPU 2 determines that the CPU 2 is recording the content or there is the recording command, the CPU 2 proceeds to step S130, in which the CPU 2 determines whether or not the CPU 2 is reproducing the content or there is the reproduction command. If neither is the case in step S130, the CPU 2 proceeds to step S151.

On the other hand, if the CPU 2 determines that the CPU 2 is reproducing the content or there is the reproduction command in step S130, the CPU 2 proceeds to step S131 and calculates the current load of the CPU 2. If it is determined that the load will allow the simultaneous execution of the recording and reproduction, the CPU 2 proceeds to step S132.

In step S132, the CPU 2 determines whether or not there is enough amount of the reproduction data spooled in the memory (RAM 4). If there is not enough amount of the spooled data, the CPU 2 outputs a data output standby command to the personal computer 12 (step S133), reads the data from the memory card 11 (step S134), and spools the data in the memory (RAM 4) (step S135).

The personal computer 12, on receiving the data output standby command, suspends the transmission of the content until the standby command is cancelled.

As described above, the CPU 2 reads and spools the data until enough amount of data is spooled in the memory so that the content may be reproduced without interruption when the operation of reading the data from the personal computer 12 is executed.

When there is a sufficient amount of data spooled in the memory, the CPU 2 outputs a data output permission notification to the personal computer 12 (step S151). On receiving the notification, the personal computer 12 outputs the content as packet data, which the player 1 receives (step S152).

After receiving the packet data, the CPU 2 determines whether or not the whole content is received by confirming an end-of-content notification transmitted from the personal computer 12 (step S153). If the end-of-content notification is active, the CPU 2 determines that the whole content is received, records the data in the memory card 11 (step S154), and returns to step S121.

If the end-of-content notification is inactive in step S153, the CPU 2 determines that there remains data to be received, and outputs a data output permission notification to the personal computer 12 to receive data (step S155), and records the received data in the memory card 11 (step S156).

As a result of the calculation of the CPU load in step S131, if it is determined that the load is such that the load does not allow the simultaneous execution of the recording and reproduction, the CPU 2 proceeds to step S160 (FIG. 7). In step S160, the CPU 2 determines the operation mode, and if the mode is the reproduction priority mode, the CPU 2 proceeds to step S161, if the mode is the recording priority mode, the CPU 2 proceeds to step S170, if the mode is the post-reproduction recording mode, the CPU 2 proceeds to step S180, and if the mode is the post-recording reproduction mode, the CPU 2 proceeds to step S181.

Among the above modes, in the reproduction priority mode, the recording of the content is stopped in step S161, and the specified content is reproduced (or the reproduction is continued) in step S162. If there remains no content to be reproduced, the reproduction is completed (step S163), and the CPU 2 returns to the process in step S121.

In the recording priority mode, the CPU 2 outputs a notification to the effect that the reproduction is not permitted to the display device 10 in step S170. The CPU 2 has the display device 10 indicate that the reproduction is inhibited. The CPU 2 outputs a recording permission notification to the personal computer 12 (step S171), and receives the packet data transmitted (step S172). The CPU 2 determines whether or not there is an end-of-content notification transmitted from the personal computer 12 (step S173), and if the recording is not completed, the CPU 2 transmits a data standby command to the personal computer 12 (step S174), and after recording the data received in step S175 in the memory card 11, outputs a recording permission notification again to the personal computer 12 (step S171).

If the CPU 2 receives an end-of-content notification from the personal computer 12 in step S173, the CPU 2 proceeds to step S184 in which the received data is recorded in the memory card 11, and completes the recording (step S177). The CPU 2 determines the operation mode (step S178), and if the operation mode is the post-recording reproduction mode, the CPU 2 restarts the interrupted reproduction (step S179), and returns to step S121.

As a result of the determination in step S178, if the operation mode is the recording priority mode, the CPU 2 returns to step S122 without doing anything.

As a result of the operation mode determination in step S160, if the operation mode is the post-reproduction recording mode, the CPU 2 proceeds to the process in step S180, where the CPU 2 outputs a recording inhibition notification to the personal computer 12. The CPU 2 reproduces the content or continues the reproduction (step S186), and when there remains no content to be reproduced, the CPU 2 completes the reproduction (step S176), and proceeds to step S171.

As a result of the operation mode determination in step S160, if the operation mode is the post-recording reproduction mode, the CPU 2 proceeds to step S181, where the CPU 2 has the reproduction suspended, and proceeds to step S171 and executes the processes of step S171 and the subsequent steps described above.

Thus, by selecting from modes such as the reproduction priority mode which gives priority to the reproduction, the recording priority mode which gives priority to the recording, the post-reproduction recording mode which starts the recording after the reproduction if the content is reproduced, and the post-recording reproduction mode which interrupts the reproduction if the content is reproduced and carries out the recording and then restarts the reproduction after the completion of the recording, and by carrying out control according to the selected mode, it is possible for a player incapable of recording and reproducing different contents simultaneously to automatically reproduce or record the content.

The recording and reproducing apparatus according to the fifth embodiment comprises the interface which is capable of bi-directional communication and is connected with the external device providing the content, the storage medium capable of recording and reproducing the content such as audio and visual data, the mode setting means which sets up mode information to specify which of the reproduction and the recording is given priority, and the control means which gives priority to either the reproduction or the recording according to the preset mode when the recording of the content transmitted from the external device and the reproduction of the content compete and the simultaneous execution of the recording and reproduction is impossible because of the limitation of the process capability of the CPU.

When the recording and the reproduction compete and both cannot be executed simultaneously, either the recording or the reproduction is selected automatically according to the preset mode, and the process with low priority is interrupted and restarted later. Thus, it is possible to carry out the recording and reproduction as desired with a simple operation. Manual operations to interrupt the reproduction when the recording is carried out, or to interrupt the recording when the reproduction is carried out are not necessary. Therefore, the recording and reproduction is executed with an extremely simple operation.

Sixth Embodiment

In the fifth embodiment, when the load of the CPU is too heavy for the simultaneous execution of the recording and reproducing, either the recording or the reproduction is suspended according to the operation mode preset in the player 1. Now, the sixth embodiment will be described which is capable of automatically executing the reproduction or recording of the content successively according to a command from the external device.

A player 1 according to this embodiment is capable of being remotely controlled its reproduction and recording of the content by the operation of only the external device connected with the player 1 by means of a bi-directional communication cable. Basic constitution of the player 1 in this embodiment is as shown in FIG. 1, and all the components have the same function as that of the components described in the first embodiment except the program of the ROM 3. Accordingly, only different components will be described here.

In the sixth embodiment, a program in the ROM 3 is capable of the operations of recording and reproducing the content simultaneously so that different contents may be recorded and reproduced simultaneously by the CPU 2. When the content is reproduced, the reproduced content is spooled in the memory (RAM 4) before the reproduction is started, which makes it possible for the reproduced content to be reproduced without interruption when received content is recorded. For that purpose, the program in the ROM 3 is capable not only of recording and reproducing the data simultaneously but of spooling a sufficient amount of data in the RAM 4 before starting the reproduction so that the reproduced content may be reproduced without interruption and of recording the received content at any time during the reproduction. The recording of the content received from the personal computer 12 is started when a recording command is transmitted from the personal computer 12. Accordingly, the personal computer 12 transmits a recording command to the player 1 before transmitting the content to the player 1 for the recording. The personal computer 12 has a function of suspending the transmission of the content until a standby command is cancelled in receiving a data output standby command from the player 1. When the standby command is cancelled, that is, when the personal computer 12 receives a data output permission notification from the player 1, the personal computer 12 starts transmitting the content.

Accordingly, the player 1 has a program in the ROM 3 which transmits to the external device through the I/F 6 a notification to the effect that the data output should be suspended until there is enough amount of the spooled data when the player 1 is ready to reproduce the content but there is not enough amount of the spooled data, and which outputs a data output permission notification when the spool of the content is completed.

The personal computer 12 has a function of transmitting an end-of-content notification to the player 1 when the transmission of the content is completed, and also has a function of indicating which of the reproduction and the recording is given priority on receiving a command request signal requiring the indication of the reproduction or recording transmitted by the player 1. The selection of the indication may be manually specified by the user or may be done by the program.

The personal computer 12 also has a function of suspending the transmission of the content to the player 1 on receiving a recording inhibition notification from the player 1, a function of suspending the transmission of the content currently being transmitted on receiving a data output standby command, and others. The function of suspending the data output makes the transmitting side suspend the transmission until the receiving side completes the process of recording the data accumulated in a receiving buffer in the memory card 11. In order to make good use of this function, this embodiment employs the packet transmission in which the content is transmitted by the packet.

The operation of the player 1 in the sixth embodiment configured as described above will be described with reference to the operation flow charts shown in FIGS. 6 and 8. The flow chart in FIG. 6 shows the process of measuring the CPU load, spooling the reproduced data and recording the content at the time of the recording and reproduction, and this process is the same as in the fifth embodiment. The operation flow chart in FIG. 8 shows a process carried out when the load is too heavy as a result of the load measurement for the simultaneous execution of the recording and reproduction.

Figure 8:
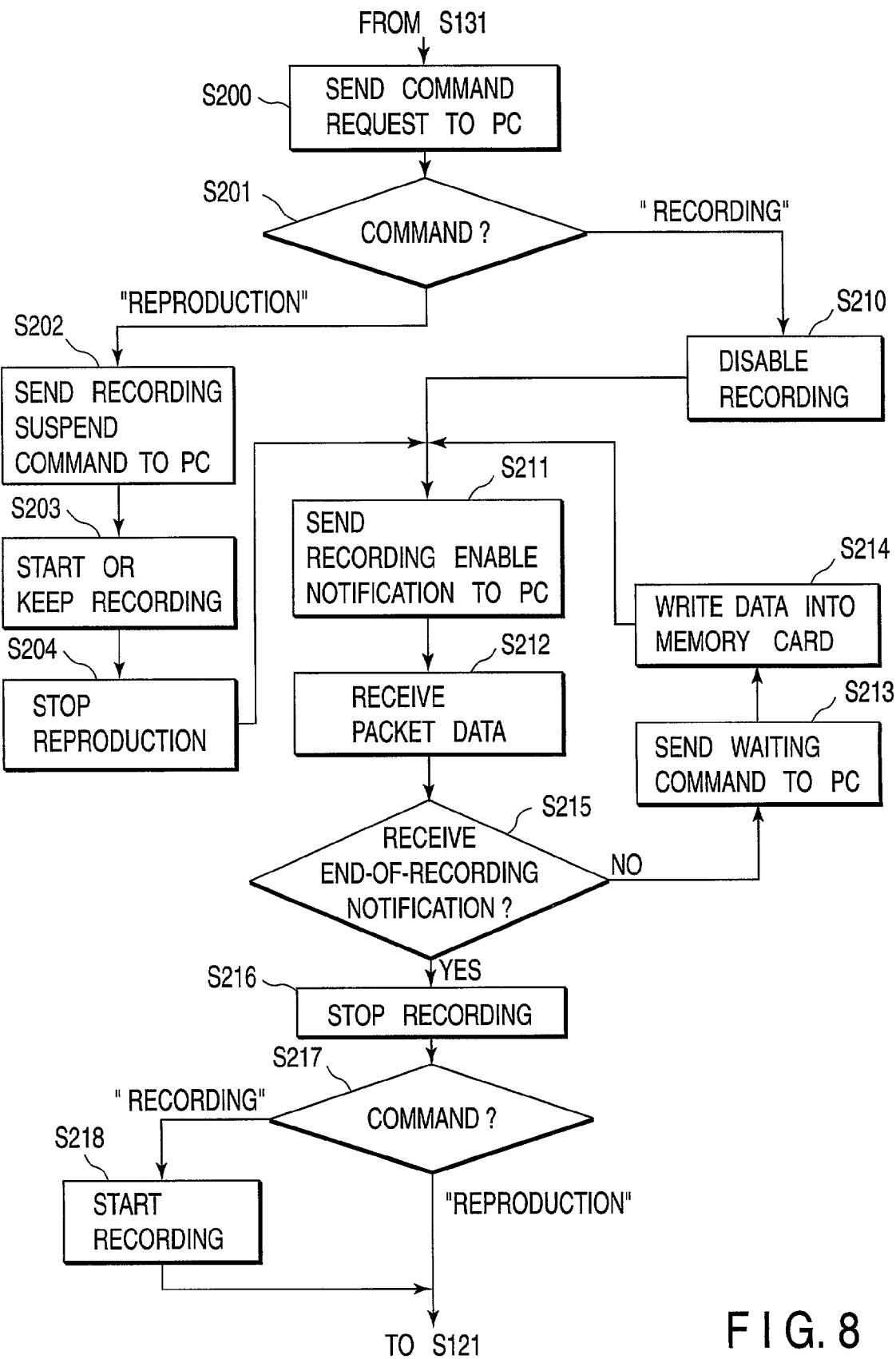
FIG. 8 is a flow chart explaining a sixth embodiment according to the present invention.

As a result of the CPU load calculation in step S131, if the load is such that the recording and the reproduction cannot be carried out simultaneously, the CPU 2 proceeds to step S200 in FIG. 8.

The CPU 2 outputs a command request signal to the personal computer 12 in step S200, having the personal computer 12 select whether to carry out the reproduction or the recording. The personal computer 12 accordingly displays a screen requiring the indication of the selection of either the reproduction or the recording. The user, on receiving this requirement, gives a command of either the reproduction or the recording.

The player 1 receives the command after the personal computer 12 transmits the command of either the reproduction or the recording, and the CPU 2 determines the command transmitted from the personal computer 12 (step S201).

If the CPU 2 determines that the command is the reproduction command, the CPU 2 outputs a recording inhibition notification to the personal computer 12 (step S202). The CPU 2 continues or starts the reproduction (step S203), and when the reproduction process of the content to be reproduced is completed (step S204), the CPU 2 proceeds to step S211.

If the command is determined to be the recording command in step S201, the CPU 2 suspends the reproduction (step S210). The reproduction process is thereby interrupted.

The CPU 2 outputs a recording permission notification to the personal computer 12 (step S211), which accordingly transmits the content by packet transmission. The CPU 2 of the player 1 receives the packet data from the personal computer 12 (step S212). The CPU 2 determines whether or not there is an end-of-content notification transmitted from the personal computer 12. If there is no end-of-content notification, the CPU 2 proceeds to step S213, where the CPU 2 outputs a data output standby command, then records the data in the memory card 11 (step S214), proceeds to step S211, and repeats the same process.

When there remains no data to be received, the personal computer 12 transmits an end-of-content notification (step S215); then the CPU 2 proceeds to step S216 and completes the recording. In step S217, as in step S201, the CPU 2 determines the command from the personal computer 12. If the command is the recording command, the CPU 2 proceeds to step S218, restarts the reproduction and returns to step S121. If the command is the reproduction command, the CPU 2 returns to S121.

As described above, the player reproducing the stored content in the sixth embodiment is a content player capable of recording content by the connection with external device for providing the content and of recording and reproducing different contents simultaneously, which determines whether or not the current process condition of the player to know the load on receiving a recording requirement of the content from the external device. If the load is too heavy for the simultaneous execution of the reproduction and recording of different contents, a command is required for the external device. According to the command from the external device, the priority of the recording process and the reproduction process is determined to execute the processes in order of priority.

The embodiment is a portable audio player capable of the simultaneous execution of the recording and reproducing which can reproduce or record the content by remote control by the operation of only the external device connected with the player by means of a bi-directional communication cable. In this embodiment, if both the recording and the reproduction cannot be executed simultaneously, either the recording or the reproduction is selected and executed simultaneously according to the priority based on the command from the external device. Thus, unlike in the case of a conventional player, it is not necessary to interrupt the reproduction to record the content during the reproduction, or to interrupt the recording to reproduce the content during the recording. Therefore, it is possible to execute the recording and reproduction with an extremely easy operation.

Additional advantages and modifications will readily occur to those skilled in the art. Therefore, the present invention in its broader aspects is not limited to the specific details, representative devices, and illustrated embodiments shown and described herein. Accordingly, various modifications may be made without departing from the spirit or scope of the general inventive concept as defined by the appended claims and their equivalents. For example, the content is mainly audio data in the above embodiments, but other content such as moving images, still pictures and others can be treated similarly. In each of the above embodiments, USB cable was used to connect the player with a personal computer, but an interface corresponding to the plug and play capable of bi-directional communication and of recognizing the connection of the device such as IEEE 1394 may be employed. In each of the above embodiments, the content is recorded in the storage medium, and the way of reading what was recorded was described; it is possible to use the inside RAM and others for the purpose of recording or reproducing the content.

What is claimed is:

1. A recording and reproducing apparatus that is operable according to first, second, third, and fourth operating modes, the apparatus comprising:
    means for recording a content supplied from an external device;
    means for reproducing the content, the reproducing means buffering content data before reproduction;
    means for detecting that a sufficient amount of the content data is buffered when a recording command is issued during reproduction;
    means for enabling said recording means when said detecting means detects that the sufficient amount of the content data is buffered;
    means for setting as an operation mode one of the first, second, third, or fourth operation modes; and
    means for controlling said recording means and said reproducing means in accordance with the operation mode when said detecting means detects that the sufficient amount of the content data is not buffered,
    wherein:
        in the first mode reproduction is continued if the apparatus is connected to the external apparatus during reproduction,
        in the second mode reproduction is stopped and recording is started if the apparatus is connected to the external apparatus during reproduction,
        in the third mode recording is started after reproduction is completed if the apparatus is connected to the external apparatus during reproduction, and
        in the fourth mode reproduction is interrupted and recording is started if the apparatus is connected to the external apparatus during reproduction and after recording is completed, the interrupted reproduction is restarted.

2. The apparatus according to claim 1, wherein said setting means comprises an interface device for manually presetting the operation mode.

3. A method of controlling a recording and reproducing apparatus comprising means for recording a content supplied from an external device and means for reproducing the content, the reproducing means buffering content data before reproduction, the method comprising:
- detecting that a sufficient amount of the content data is buffered when a recording command is issued during reproduction;
- enabling said recording means when said detecting means detects that the sufficient amount of the content data is buffered;
- setting an operation mode; and
- controlling said recording means and said reproducing means in accordance with the operation mode when it is detected that the sufficient amount of the content data is not buffered, wherein the operation mode includes a first mode, a second mode, a third mode, and a fourth mode, and wherein in the first mode reproduction is continued if the apparatus is connected to the external apparatus during reproduction, in the second mode reproduction is stopped and recording is started if the apparatus is connected to the external apparatus during reproduction, in the third mode recording is started after reproduction is completed if the apparatus is connected to the external apparatus during reproduction, and in the fourth mode reproduction is interrupted and recording is started if the apparatus is connected to the external apparatus during reproduction and after recording is completed, the interrupted reproduction is restarted.

* * * * *